United States Patent
Fanello et al.

(10) Patent No.: US 9,734,424 B2
(45) Date of Patent: Aug. 15, 2017

(54) SENSOR DATA FILTERING

(71) Applicant: MICROSOFT TECHNOLOGY LICENSING, LLC, Redmond, WA (US)

(72) Inventors: Sean Ryan Francesco Fanello, Genoa (IT); Cem Keskin, Cambridge (GB); Pushmeet Kohli, Cambridge (GB); Shahram Izadi, Cambridge (GB); Jamie Daniel Joseph Shotton, Cambridge (GB); Antonio Criminisi, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/252,638

(22) Filed: Apr. 14, 2014

(65) Prior Publication Data

US 2015/0296152 A1 Oct. 15, 2015

(51) Int. Cl.
*G06K 9/52* (2006.01)
*G06K 9/00* (2006.01)
*G06K 9/40* (2006.01)
*G06K 9/62* (2006.01)
*G06T 5/00* (2006.01)
(Continued)

(52) U.S. Cl.
CPC ............ *G06K 9/52* (2013.01); *G06K 9/0051* (2013.01); *G06K 9/40* (2013.01); *G06K 9/6268* (2013.01); *G06T 5/002* (2013.01); *G06T 5/20* (2013.01); *G06T 2207/10028* (2013.01); *G06T 2207/20081* (2013.01); *H04N 5/217* (2013.01)

(58) Field of Classification Search
CPC ...... H04N 5/357; H04N 9/045; G06K 9/6256; G06K 9/52; G06T 5/00; G06T 7/0051
See application file for complete search history.

(56) References Cited

U.S. PATENT DOCUMENTS

| | | | |
|---|---|---|---|
| 2009/0268818 A1* | 10/2009 | Lu | H04N 19/61 375/240.15 |
| 2012/0239174 A1* | 9/2012 | Shotton et al. | 700/93 |
| 2014/0314310 A1* | 10/2014 | Movellan et al. | 382/155 |

OTHER PUBLICATIONS

Keskin, et al., "Hand Pose Estimation and Hand Shape Classification Using Multi-layered Randomized Decision Forests," In Proceedings of the 12th European Conference on Computer Vision—vol. Part VI, Oct. 7, 2012, pp. 852-863 (hereinafter "Keskin").*

* cited by examiner

*Primary Examiner* — Mekonnen Dagnew (57) ABSTRACT

Filtering sensor data is described, for example, where filters conditioned on a local appearance of the signal are predicted by a machine learning system, and used to filter the sensor data. In various examples the sensor data is a stream of noisy video image data and the filtering process denoises the video stream. In various examples the sensor data is a depth image and the filtering process refines the depth image which may then be used for gesture recognition or other purposes. In various examples the sensor data is one dimensional measurement data from an electric motor and the filtering process denoises the measurements. In examples the machine learning system comprises a random decision forest where trees of the forest store filters at their leaves. In examples, the random decision forest is trained using a training objective with a data dependent regularization term.

20 Claims, 8 Drawing Sheets

(51) Int. Cl.
*G06T 5/20* (2006.01)
*H04N 5/217* (2011.01)

SENSOR DATA FILTERING

BACKGROUND

Sensor data, such as images, videos, microphone audio signals, environmental sensor data such as from temperature sensors, velocity sensors, light sensors, depth sensors, and other sensor data is often filtered before being used in control systems and other downstream processes. The filtering process may be used for many purposes such as: to remove noise, to refine the sensor data by removing outliers or filling in missing values, or to identify features in the signal such as edges.

Some existing signal filtering approaches are convolution-based. These approaches involve computing updated values of the signal on the basis of a kernel of values which are placed over parts of the signal. For example, in the case of a two dimensional image, the kernel may be a two dimensional array which is smaller than the image. The value of an image pixel which falls under the center of the kernel may be replaced by an aggregate of the pixel values falling under the whole kernel, weighted by associated values stored in the kernel. The kernel is moved over the image to compute new values of the image pixels in a process known as convolution. The kernel of values may be referred to as a filter.

Existing convolution-based filtering approaches have limited accuracy because they depend on the choice of filter used. In addition, existing filtering approaches that are competitive in terms of accuracy (i.e. not basic convolution such as with Gaussian filters) are time consuming to compute, especially for complex tasks such as image denoising. Reduction of computation time (whilst maintaining high accuracy) is particularly significant as the accurate filtered output is typically used for real time control of a downstream system, such as a robotic system, a computing device, a mechanical system such as a motor, or other equipment.

Other types of sensor data filtering systems are known such as those using Kalman filters or Least Mean Squares (LMS) filters. In the case of image filtering, many complex image specific filters are known. These systems are complex and there is a desire to improve accuracy and/or reduce the amount of computational resources used by these types of filters.

The embodiments described below are not limited to implementations which solve any or all of the disadvantages of sensor data filtering and/or control systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Filtering sensor data is described, for example, where filters conditioned on a local appearance of the signal are predicted by a machine learning system, and used to filter the sensor data. In various examples the sensor data is a stream of noisy video image data and the filtering process denoises the video stream. In various examples the sensor data is a depth image and the filtering process refines the depth image which may then be used for gesture recognition or other purposes. In various examples the sensor data is one dimensional measurement data from an electric motor and the filtering process denoises the measurements. In examples the machine learning system comprises a random decision forest where trees of the forest store filters at their leaves. In examples, the random decision forest is trained using a training objective with a data dependent regularization term.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
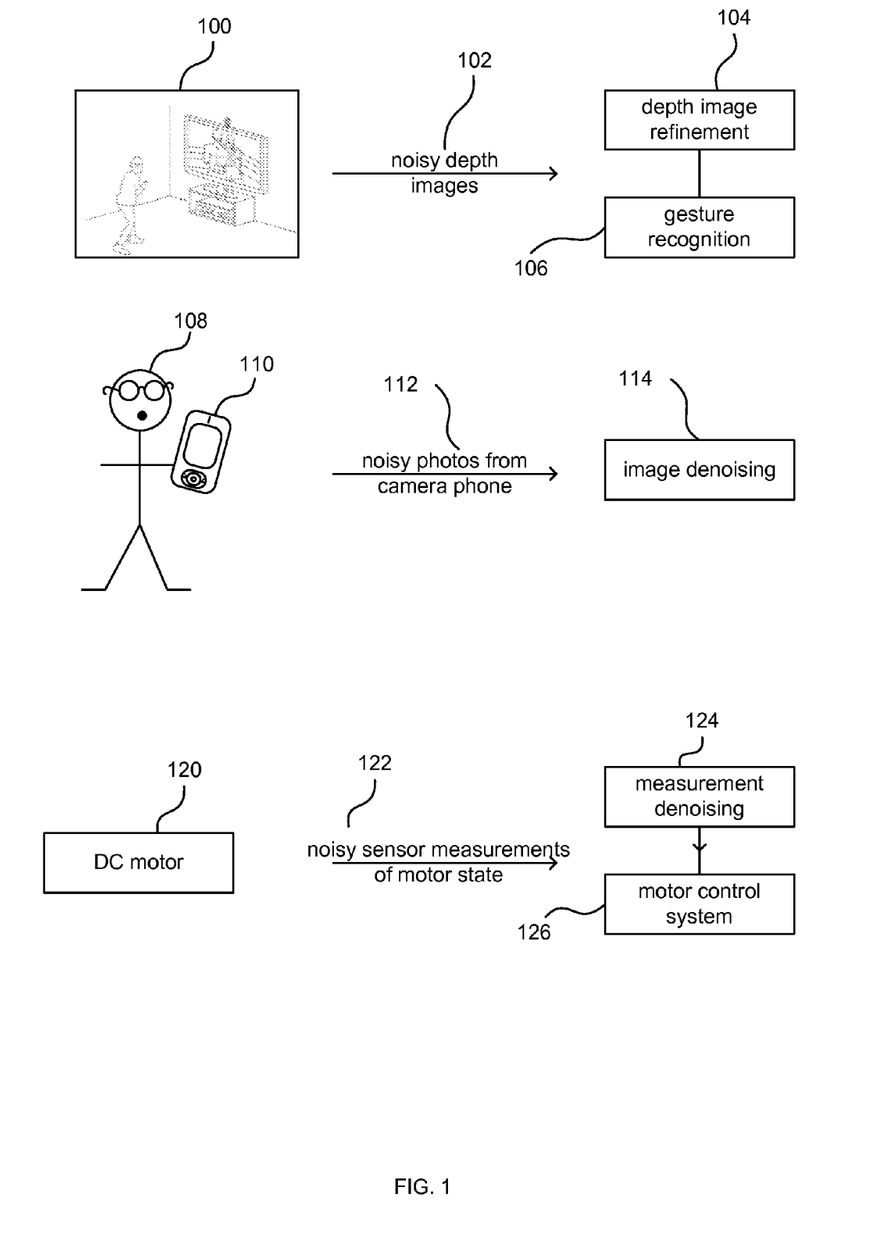
FIG. 1 is a schematic diagram of a plurality of different systems comprising a machine learning system trained to predict filters for filtering sensor data.

FIG. 1 is a schematic diagram of a plurality of systems in which a machine learning system for predicting sensor data filters is used. The filters are predicted such that they are conditioned on a local appearance of the signal. For example, a depth image refinement module 104 operating on noisy depth images 102. The depth images may be from a natural user interface of a game device as illustrated at 100 or may be from other sources. The depth image refinement module 104 comprises a trained machine learning system which predicts filters to be applied to individual parts of the noisy depth images. The depth image refinement module applies the predicted filters to refine the depth images and the resulting refined depth images are input to downstream processes such as gesture recognition module 106. Gesture recognition module 106 may comprise one or more components to compute body part classification or joint position information and to calculate gesture recognition 106. For example, joint position information or body part classification may be computed using trained random decision forests. The body part or joint position information may be used to compute a skeletal representation of all or part of an articulated entity, such as a person or a person's hand. The skeletal representation may be compared with templates, rules, criteria, thresholds or other data to classify the data depicted in the depth image into one of a plurality of possible gesture classes. The gesture class data may be used to control a computing device through a natural user interface.

In another example, a person 108 with a camera phone 110 captures a noisy photo or video using his or her camera phone 112 and sends the captured image(s) to an image denoising module 114 (which may be integral with the camera phone or may be provided as a cloud service). The image denoising module 114 comprises a machine learning system that predicts filters for filtering the images in order to denoise them. A plurality of filters may be predicted with individual filters being predicted for use on individual patches of the images. The individual filters may be different from one another; for example, the individual filters may be conditioned on a local appearance of the associated individual image patches and may differ in size. The denoised images/videos may be compressed before being transmitted to other computing devices and then decompressed. By achieving fast, accurate denoising before the compression/decompression process, improvements are obtained in the compression/decompression process as well.

In another example noisy sensor measurements 122 of state of a motor, such as a DC motor 120 are taken by a motor control system 126. A measurement denoising module 124 filters the measurements to remove noise and the denoised measurements are used by the motor control system 126 to adjust parameters of the motor to enable it to work more efficiently. The measurement denoising module 124 comprises a trained machine learning system which predicts filters for filtering the measurements in order to denoise them. A plurality of filters may be predicted with individual filters being predicted for use on individual portions of a stream of the measurements. The individual filters may be different from one another; for example, the individual filters may be conditioned on a local appearance of the measurement signal.

In the examples of FIG. 1 a machine learning system is used to predict a plurality of filters with individual filters being predicted for use on individual portions of a sensor data signal. The sensor data signal can be an image, a stream of images, a 3 or higher dimensional image (in the case of medical images for example), a stream of measurements, or other sensor data signals. The predicted individual filters may be applied to the sensor data to give improved accuracy for a wide range of tasks, including but not limited to image denoising (including video denoising and medical image denoising), depth image refinement, and one dimensional sensor data denoising. This gives better accuracy as compared with previous systems using equivalent amounts of computing resources and training time. In addition, processing time is significantly reduced. For example, on image denoising, the methods described herein give a speed up of a factor of 4 with respect to alternative filtering methods. This is particularly important where real time applications are involved such as video streaming, robotic control, control of computing devices using natural user interfaces, control of motors and other physical equipment, and others. The resulting machine learning systems are compact which facilitates their use on devices where memory resources are limited such as on smart phones or embedded devices.

In the examples described herein the machine learning system is implemented using random decision trees. However, this is not essential. Other types of machine learning system such as neural networks, support vector machines or others may be used.

More detail about random decision trees is now given.

A random decision tree comprises a root node connected to a plurality of leaf nodes via one or more layers of internal split nodes. A random decision tree may be trained to carry out classification, regression or density estimation tasks. For example, to classify examples into a plurality of specified classes, to predict continuous values associated with examples, and to estimate densities of probability distributions from which examples may be generated. During training, examples with associated ground truth labels may be used.

An ensemble of random decision trees may be trained and is referred to collectively as a forest. At test time, test examples (such as portions of a sensor data signal) are input to the trained forest to find a leaf node of each tree. Data accumulated at those leaf nodes during training (such as filters in the examples herein) may then be accessed and aggregated to give a predicted output. By aggregating over an ensemble of random decision trees in this way improved results are obtained.

A forest is an ensemble of T decision trees. Each tree consists of non-terminal (split) and terminal (leaf) nodes. At test time a pixel i is passed into the root node. At each split node j, a split function $f(i; \theta_j)$ is evaluated. This computes a binary decision based on some function of the image that surrounds the pixel i, based on learned parameters $\theta_j$. Depending on this binary decision, the pixel passes either to the left or right child. When a leaf is reached, a stored histogram over class labels (for classification) or a density over continuous variables (for regression) is output. In the examples described herein a filter is stored (see below)

Each tree in the forest is trained independently. A set of example pixel indices i and their corresponding ground truth labels are provided. Starting at the root, a set of candidate binary split function parameters $\theta$ are proposed at random, and for each candidate, the set of training pixels is partitioned into left and right child sets. An objective function (typically information gain for classification problems) is evaluated given each of these candidate partitions, and the best θ is chosen. Training then continues greedily down the tree, recursively partitioning the original set into successively smaller subsets. Training stops when a node reaches a maximum depth D or contains too few examples.

Figure 2:
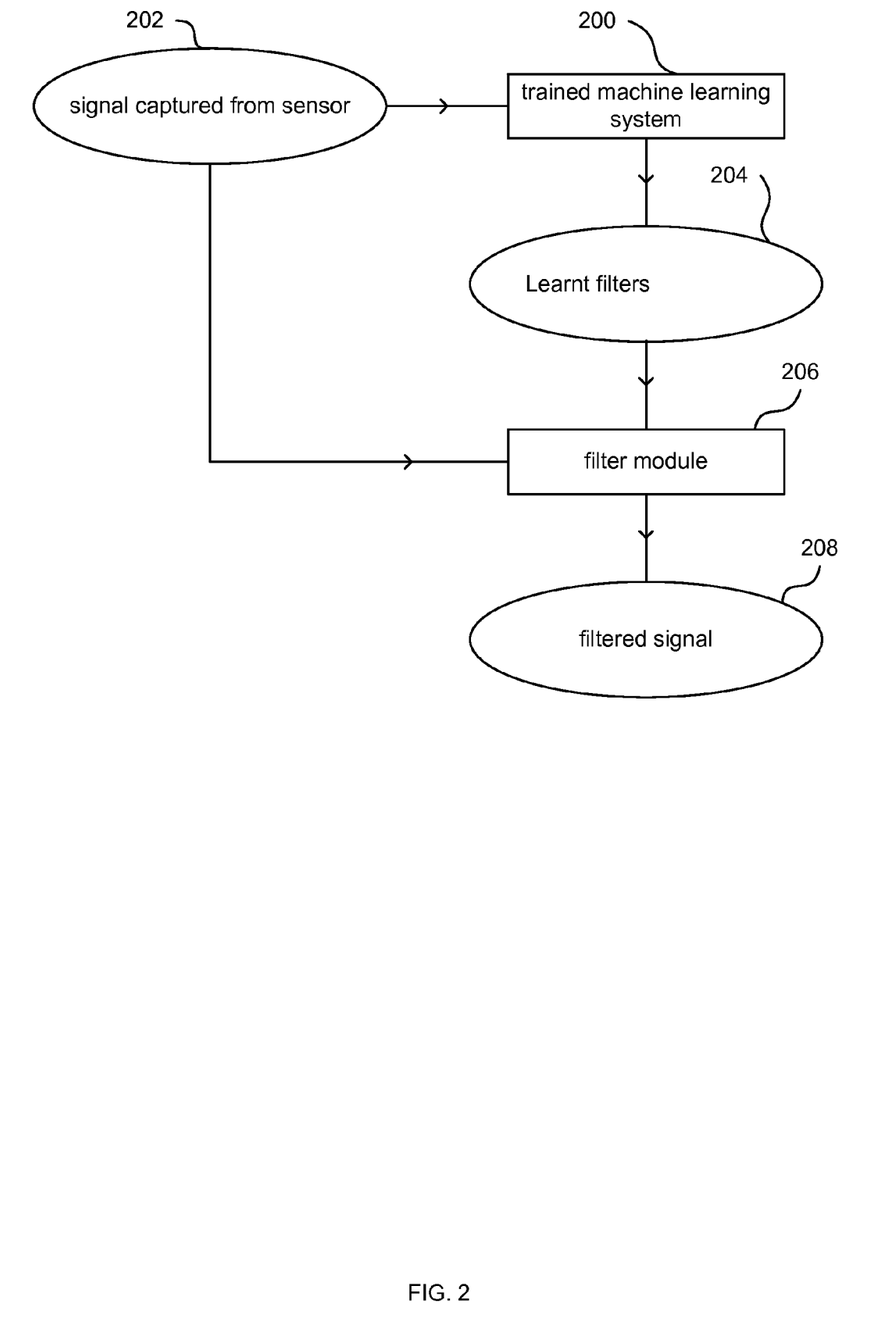
FIG. 2 is a schematic diagram of a trained machine learning system that may be used in the deployments of FIG. 1.

FIG. 2 is a schematic diagram of a trained machine learning system 200 which may be used in any of the examples of FIG. 1 or other examples. A signal captured from a sensor 202 is input to the trained machine learning system. As mentioned above, the signal may comprise an image, a stream of images, environmental sensor data, medical sensor data, medical imaging data, sensor data monitoring state of physical equipment. The trained machine learning system predicts a plurality of filters, individual ones of the filters being predicted for individual parts of the signal. The output of the trained machine learning system can be thought of as a plurality of learnt filters 204, individual filters being for application to a specific part of the signal. A filter module 206 applies the filters 204 to the signal 202 to compute a filtered signal 208 which may be stored and/or input to a downstream process.

Figure 3:
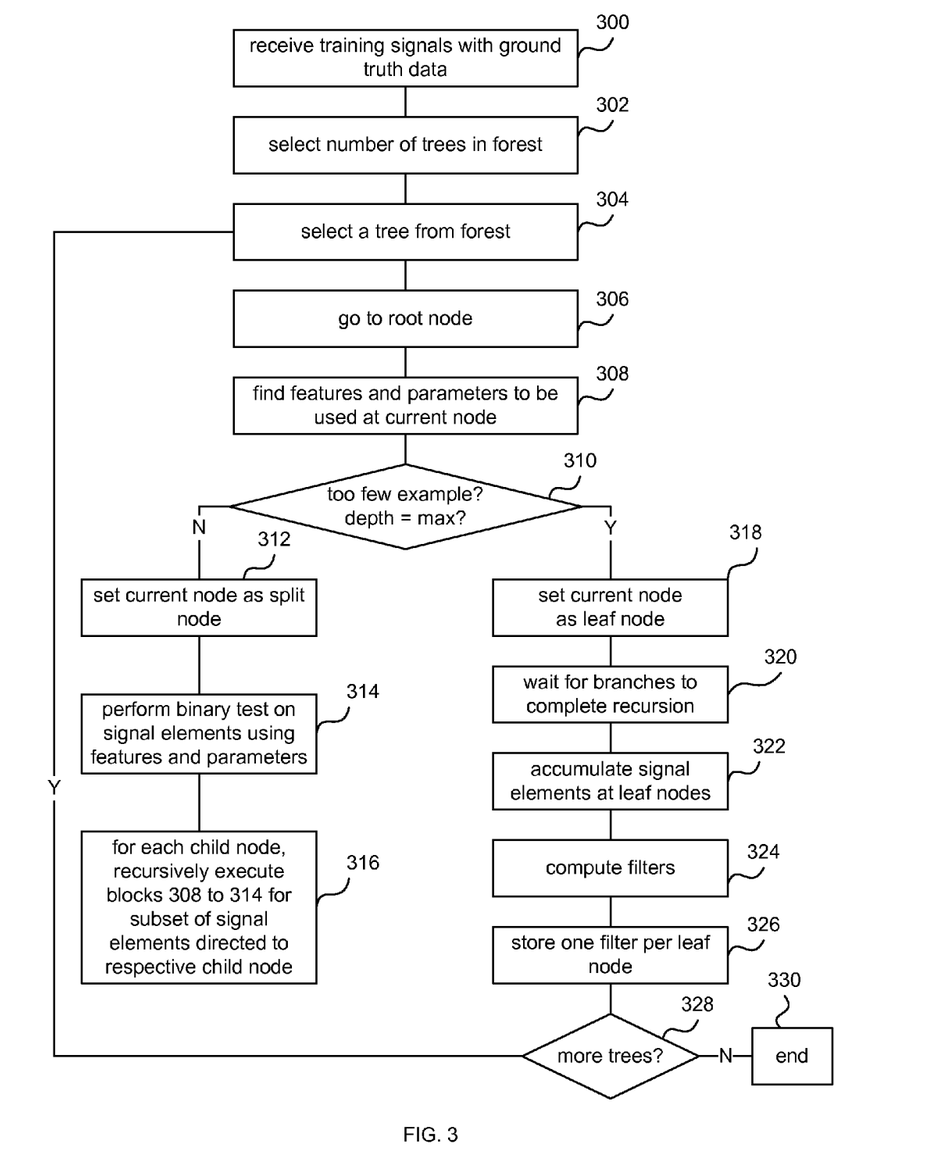
FIG. 3 is a schematic diagram of a method of training a random decision tree for use in the deployments of FIG. 1 or other deployments.

In various examples, the trained machine learning system 200 of FIG. 2 comprises a random decision forest which has been trained using a method such as that now described with reference to FIG. 3. This method may be carried out by a tree training logic 816 such as that described below with reference to FIG. 8. The tree training logic 816 is computer implemented using software and/or hardware.

The training logic receives 300 training signals with associated ground truth data. The training logic uses training data which is tailored for the particular task or application domain. For example, in the case of image denoising the training data may comprise pairs of noisy image patches and their corresponding noise-free ground truth values. The training data may be empirically observed and/or synthetically generated. For example, synthetic noise of specified characteristics may be added to noise free ground truth images to create training data for image denoising. In the case of depth image refinement, the training data may comprise pairs of noisy depth image patches (empirically observed from a depth camera) and their corresponding noise-free ground truth values (obtained from an empirically obtained depth reconstruction of the scene). In the case of 1D measurement signal denoising, the training data may comprise pairs of noisy measurements (synthetically generated by adding noise) and their corresponding noise-free ground truth values.

The training logic selects a number of trees to be in the forest 302 for example, by using a default number which may be empirically determined. The training logic selects 304 a tree from the forest and goes to the root node 306 of that tree. The training logic computes 308 features and parameters to be used at the current node by searching a randomly generated set of possible features and parameters. More detail about how the features and parameters are computed is given below with reference to FIG. 4 and FIG. 5. The training logic checks if it should stop growing the tree. For example, this check 310 may comprises checking if the current depth of the tree has reached a specified maximum and/or checking if too few training examples (training signal elements) have reached the current node.

If the training logic is to continue growing the tree it sets 312 the current node as a split node and performs a binary test 314 on the training signal elements at the node, using the features and parameters computed for use at the current node (in step 308). A training signal element is a part or portion of the training signal such as an image patch or a subset of measurements from a stream of sensor measurements. For each child node of the current node, the training logic recursively executes 316 blocks 308 to 314 of FIG. 3 for the subset of training signal elements directed to the respective child node.

If the training logic is not to continue to grow the tree it sets the current node as a leaf node 318 and waits for branches of the tree to complete recursion 320. Training signal elements have accumulated 322 at leaf nodes of the tree during the training process. At a given leaf node, the tree training logic computes 324 a filter using the training signal elements which have accumulated at the leaf node. The tree training logic stores one filter per leaf node 326 and checks if there are more trees in the forest 328. Once all trees have been trained the process ends 330.

Figure 4:
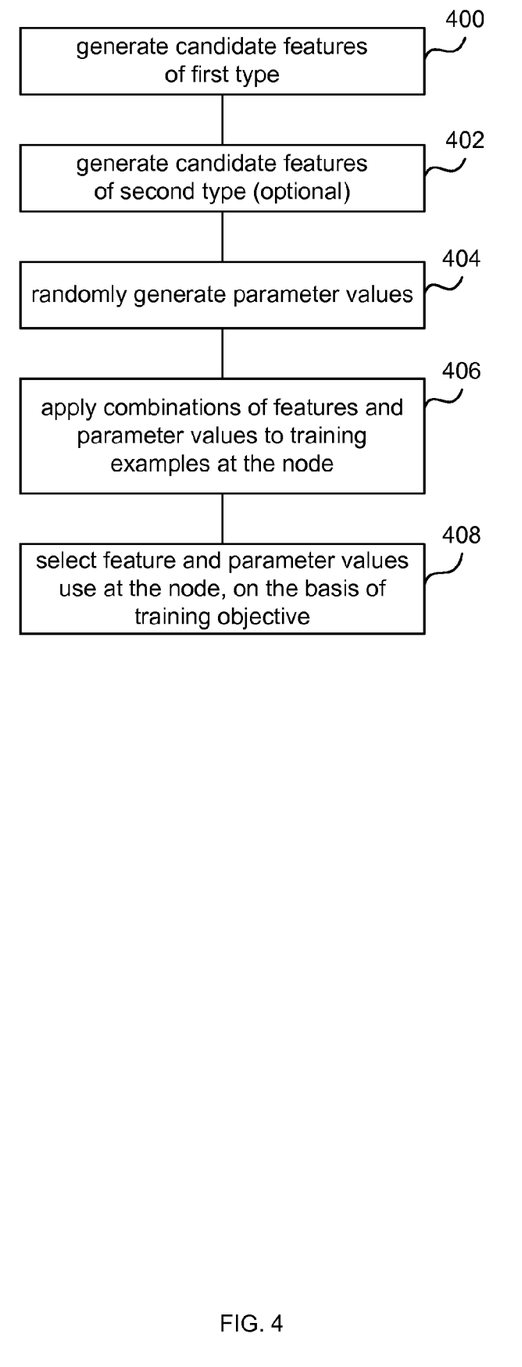
FIG. 4 is a flow diagram of part of the method of FIG. 3 in more detail.

More detail about the process of computing the features and parameters to use at a split node (step 308 of FIG. 3) is now given with respect to FIG. 4. In various examples, features and parameters are selected from a plurality of different features and a plurality of different parameter values (or ranges). The selection may be made from a randomly generated set of possibilities. In some examples a plurality of different types of features are available to choose from.

For example, the training logic may generate 400 candidate features of a first type. In various examples, the first type of features are uniformity estimators, for example, computations of variance of signal elements at different scales.

In the case of image denoising and depth image refinement the first type of features may be computed by calculating variance of intensity values of pixels in image patches of different sizes. In the case of RGB images the variance features may be available for individual color channels and/or by aggregating values over color channels.

For example, the training logic may generate 402 candidate features of a second type. This is optional as in some examples the second type of features may be omitted completely, or omitted during a training of a first few layers of each tree (this may help to separate smooth regions from textured ones early on). The second type of features may comprise a multi-scale filter bank (referred to as a split node filter bank herein to avoid confusion with the filters at the leaf nodes which are different). The split node filter bank may comprise filters computed from components of a principal components analysis of the training examples (either training examples from the complete training data set or training examples reaching the current node).

The training logic randomly generates parameter values 404 for use at the split nodes. For example, the parameter values may comprise thresholds for use with the first type of features. In this case a binary test at a split node may comprise checking if the variance of a given signal element (image patch, subset of 1D signal stream) is less than or greater than the threshold. For example, the parameter values may comprise thresholds for use with the second type of features. In this case a binary test at a split node may comprise checking if the output of a filter from the split node filter bank is greater than or less than the threshold. In another example, the binary test at the split node may comprise checking if the difference between outputs of two filters from the split node filter bank is greater than or less than the threshold.

The training logic applies 406 combinations of the features and parameter values to the training examples which have reached the node. It selects 408 feature and parameter values for use at the node, on the basis of a training objective. More detail about the training objective is given later in this document.

In examples, the first and second types of features may be computed in advance and retrieved from a look up by the training logic. This speeds up the training process. The look up may be reused during test time as explained below.

Figure 5:
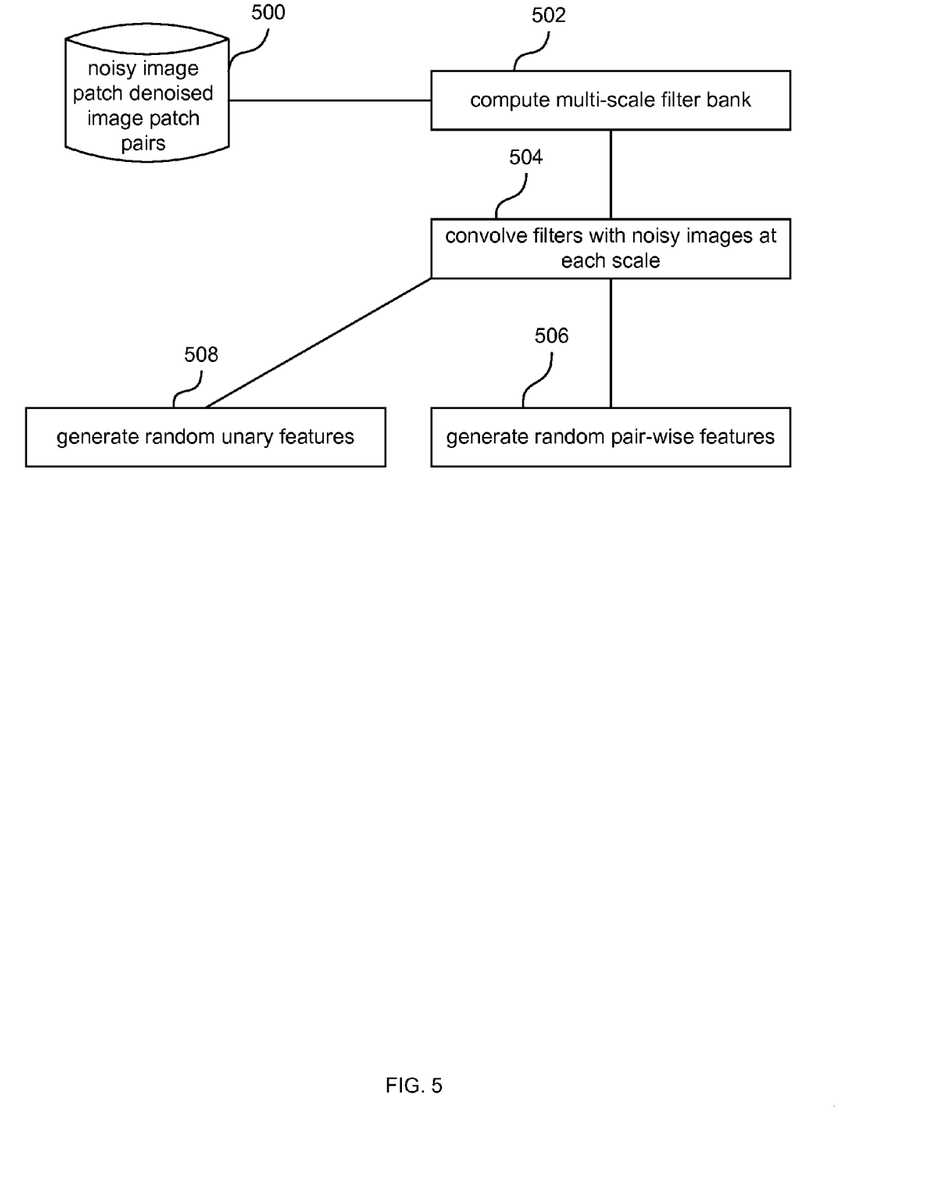
FIG. 5 is a flow diagram of part of the method of FIG. 3 for an image denoising system.

More detail about step 402 of FIG. 4 is now given with reference to FIG. 5. This example is described with reference to image denoising but it is also applicable to other tasks such as depth image refinement, 1D signal denoising and others. Training data 500 comprising noisy image patch and denoised image patch pairs is accessed by the training logic and used to compute 502 a multi-scale filter bank (of split node filters). This is done by carrying out a principal component analysis of the training examples and the top n components of the analysis to form filters, at each of a plurality of scales. Note it is not essential to use multiple scales. The resulting split node filters may be convolved with noisy image patches 504 at each scale and used to generate unary features 508 and/or pair-wise features 506. The unary features compare the output of the convolution with a threshold as mentioned above. The pair-wise features compare the difference of the output of two convolutions (with different split node filters) with a threshold.

More detail about the training objective is now given.

In various examples a training objective selects the parameters of the split function which minimize a sum of energies of the two child nodes of the current node. The energy of each child node may be computed as:

$$E^c(S_j^c) = \min_w \|y_j^c - w^T X_j^c\|^2$$

Which may be expressed in words as, the energy of a child node c of split node $S_j$ is computed as the minimum over possible values of filter w of an L2 norm of the differences between the filtered input signal and the ground truth value.

In some examples the energy of each child node also comprises a regularization term.

$$E^c(S_j^c) = \min_w \|y_j^c - w^T X_j^c\|^2 + \|w\|^2$$

In this case the energy of each child node may be computed as the minimum over possible values of filter w of: the sum of an L2 norm of the difference between the set of filtered training elements and the set of ground truth values that have reached the child node and a regularization term which is the L2 norm of the filter w. By using the regularization term overfitting is ameliorated.

In some examples the energy of each child node comprises a regularization term which is data dependent. For example, $$E^c(S_j^c) = \min_w \|y_j^c - w^T X_j^c\|^2 + \|\Gamma(X_j^c, y_j^c)w\|^2$$

Where $\Gamma(X_j^c, y_j^c)$ represents a data dependent regularization weighting matrix. This term encourages edge-preserving regularization. In an example, the data dependent regularization weighting matrix encourages smaller entries in the filter w when those entries differ from a signal element i. For example the regularization matrix is a diagonal matrix of size $p^2 \times p^2$ (where p is the length of a size of a patch in the case that image patches are being considered) and is computed as a function of the data matrix X (i.e. the input signal expressed as a matrix) and ground truth values y as follows:

$$\gamma_d(X, y) = \frac{1}{N} \sum_{i=1}^{N} (x_{i,d} - y_i)^2$$

Where d indexes pixels within the patch, N is the total number of samples (i.e. the number of rows) in X, and $x_{i,d}$ and $y_i$ are entries in X and y respectively.

Use of a data dependent regularization term, which is edge—preserving has been found particularly effective for image denoising tasks, depth image refinement tasks, and 1D equipment state measurement denoising.

In various examples, during training, a filter w* is computed at a leaf node by calculating a regularized least squares error minimization over the subset of labeled training examples that reach the leaf. This computation may comprise:

$$w^* = (X^T X + \Gamma^T \Gamma)^{-1} X^T y$$

Figure 6:
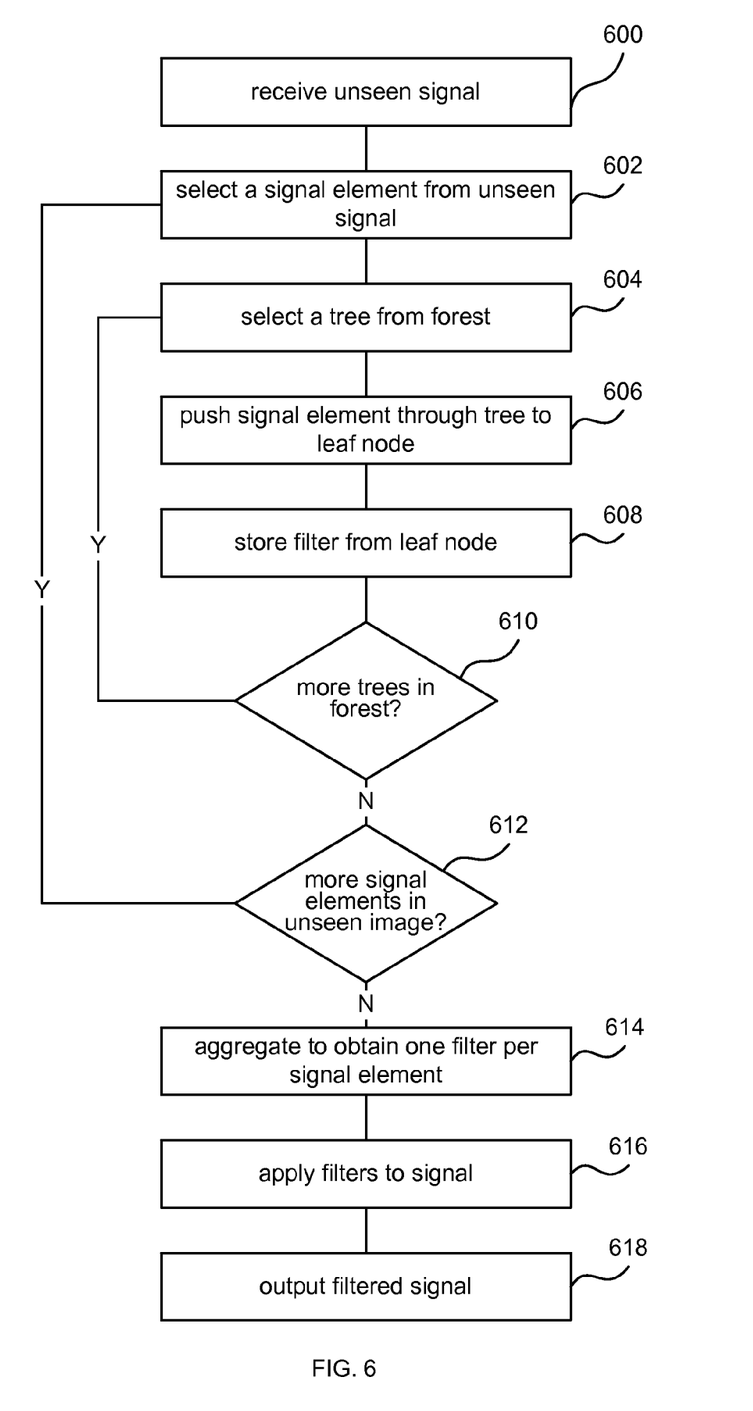
FIG. 6 is a flow diagram of a method of using a trained machine learning system at test time, such as in any of the deployments of FIG. 1 or other deployments.
Figure 8:
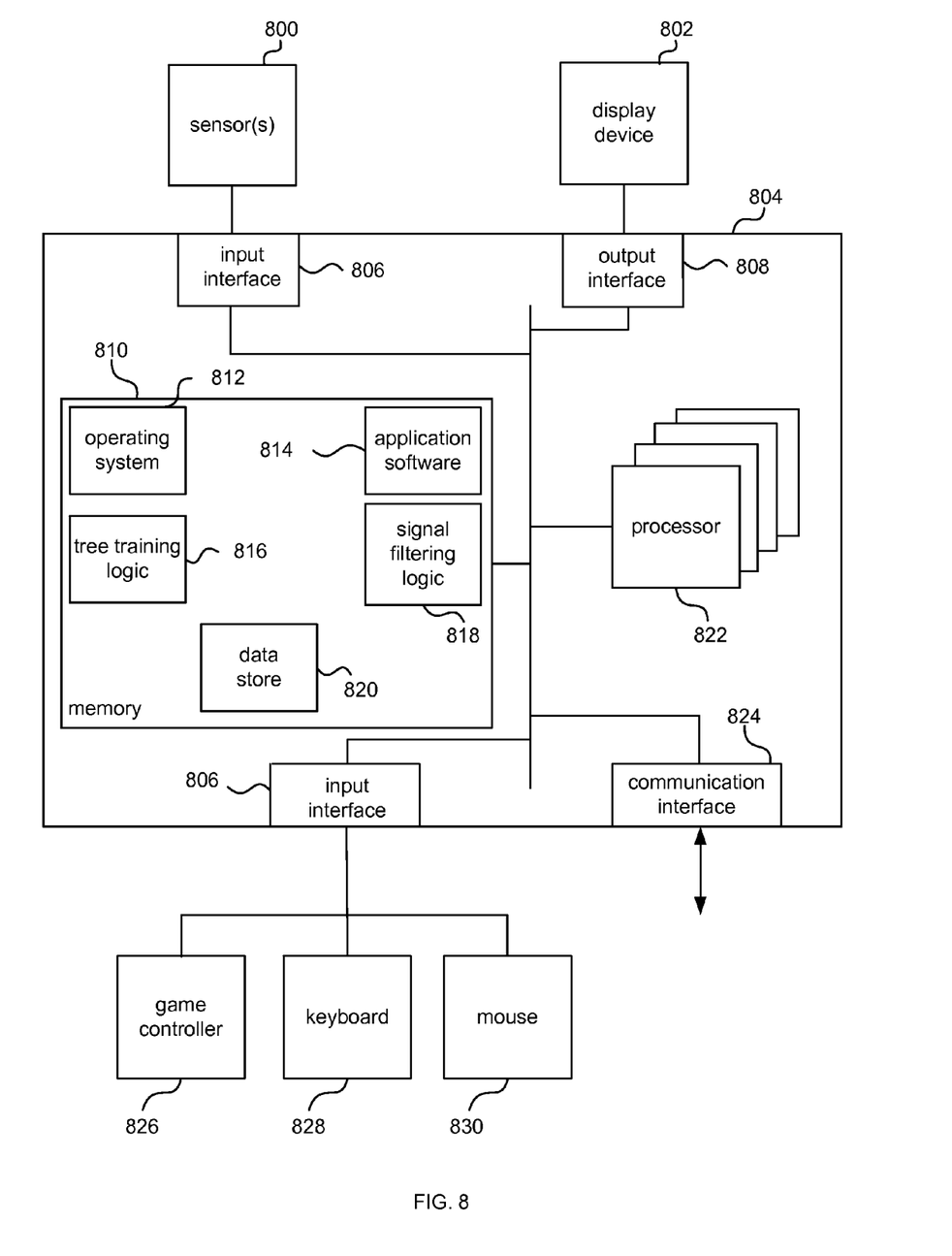
FIG. 8 illustrates an exemplary computing-based device in which embodiments of a system for filtering sensor data may be implemented; in some examples the computing-based device of FIG. 8 trains random decision forests to predict filters for filtering sensor data.

FIG. 6 is a flow diagram of a method at a trained machine learning system such as signal filtering logic 818 of FIG. 8 or the trained machine learning components within the deployments of FIG. 1.

An unseen signal is received 600. The term "unseen" means that the signal was not part of the training data used to train the machine learning system. A signal element is selected 602 from the unseen signal. The signal element is part of the unseen signal such as an image patch, a plurality of sensor measurements. The selection may be made at random, using a sampling method such as reservoir sampling, or in other ways. The trained machine learning system selects 604 a tree from the forest and pushes 606 the signal element through the tree to a leaf node. More detail about how this is achieved is given below. The trained machine learning system stores 608 the filter found at the leaf node; the machine learning system also knows the associated signal element which was used to index the leaf node. If there are more trees in the forest 610 the process repeats from step 604. If there are more signal elements 612 in the unseen signal to be processed the process repeats from step 602.

The trained machine learning system now has one filter found per tree. It may aggregate 614 the filters to obtain one filter per signal element, or may select a filter, such as the one with the best certainty where certainty information is available from the trees. The trained machine learning system applies 616 each filter to its associated signal element and outputs 618 a filtered version of the unseen signal. For example, in the case of image filtering, the filtered version is the dot product of the filter kernel stored at the leaf node and the relevant patch of image centered on the pixel currently being filtered. The size of the relevant patch of image may be chosen to match the size of the filter kernel stored at the leaf node.

The process of step 606 may be carried out in parallel for each signal element. In some examples, a fast post-processing filter (such as a Weiner Filter) may be applied to the filtered version of the unseen signal. However, this is not essential.

The process of step 606 comprises computing binary tests at split nodes reached by the selected signal element. Where the binary tests comprise computing features of the first type, this may comprise computing a variance of a range of values around the signal element (according to the scale of the feature). Where the binary tests comprise computing features of the second type, this may comprise applying a split node filter to a range of values around the signal element (according to the scale of the feature). In this way the split node tests take into account local appearance of the signal.

Figure 7:
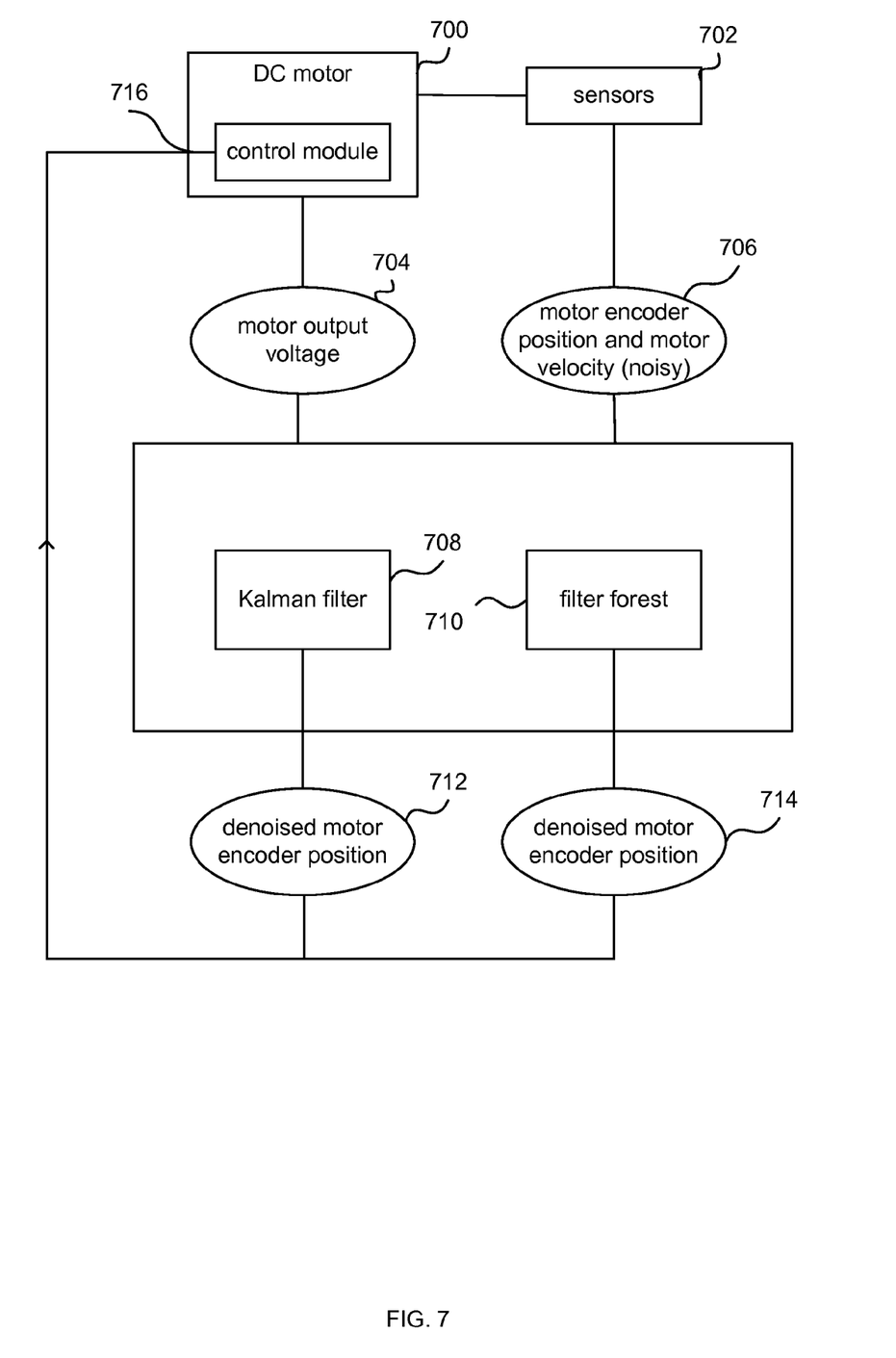
FIG. 7 is a flow diagram of a control system for a DC motor.

FIG. 7 is a schematic diagram of a control system for a DC motor 700. The DC (direct current) model comprises a control module and the DC motor 700 is empirically observed using sensors 702 which monitor a motor encoder position and a motor velocity 706. The output from the sensors is noisy due to limitations of the sensor, environmental conditions and other factors. The DC motor generates an output voltage 704 which is empirically observed using appropriate equipment. A trained machine learning system, such as a filter forest 710 (random decision forest trained as described herein) has access to the sensor output and the voltage data. The trained machine learning system predicts filters and uses the predicted filters to denoise the sensor output to produce denoised motor encoder position 714. A Kalman filter 708 may be used for the same purpose and is shown here for comparison only. Output from the filter forest 710 may be fed back to the control module 716 of the DC motor and used to adjust components of the motor to improve its efficiency. It has been found that the trained filter forest 710 is able to produce more accurate results in this type of scenario than the Kalman filter.

Alternatively, or in addition, the functionality of the tree training logic, and/or the trained machine learning system described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

FIG. 8 illustrates various components of an exemplary computing-based device 804 which may be implemented as any form of a computing and/or electronic device, and in which embodiments of a training system for training a machine learning system to predict sensor signal filters may be implemented. The computing based device 804 may be used to implement a sensor signal filtering system, for example, as part of a game system, or other computing system with a natural user interface, as part of an image/video denoising system on a camera phone or other device, as part of a measurement signal denoising system in a robotic or other physical equipment control system.

Computing-based device 804 comprises one or more processors 822 which may be microprocessors, controllers or any other suitable type of processors for processing computer executable instructions to control the operation of the device in order to train machine learning systems for predicting sensor data filters; or to operate machine learning systems which have been trained to filter sensor data. In some examples, for example where a system on a chip architecture is used, the processors 822 may include one or more fixed function blocks (also referred to as accelerators) which implement a part of the method of any of FIGS. 2-6 in hardware (rather than software or firmware). Platform software comprising an operating system 812 or any other suitable platform software may be provided at the computing-based device to enable application software 814 to be executed on the device.

The computer executable instructions may be provided using any computer-readable media that is accessible by computing based device 804. Computer-readable media may include, for example, computer storage media such as memory 810 and communications media. Computer storage media, such as memory 810, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 810) is shown within the computing-based device 804 it will be appreciated that the storage may be distributed or located remotely and accessed via a network or other communication link (e.g. using communication interface 824).

The computing-based device 804 comprises an input interface 806 which receives input from a sensor 800 such as a video camera, depth camera, stereo camera, smart phone camera, web camera, medical imaging apparatus, equipment state sensor, environmental sensor or other sensor.

In some examples, the computing-based device 804 comprises an output interface 808 which sends output to a display device 802. For example, to display a graphical user interface of application software 814 executing on the device, or to display a representation of the sensor data received from sensor 800 before and after filtering.

In some examples the computing-based device 804 comprises input interface 806 which receives input from one or more of a game controller 826, keyboard 828, and mouse 830. For example, where the computing-based device implements a game system with gesture based control, the gestures being recognized from images captured by sensor 800.

The display device 802 may be separate from or integral to the computing-based device 804. The display information may provide a graphical user interface. In an embodiment the display device 802 may also act as a user input device if it is a touch sensitive display device. The output interface 808 may also output data to devices other than the display device 802, e.g. a locally connected printing device.

Any of the input interface 806, output interface 808 and display device 802 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method comprising:
receiving, at a processor, an input signal from a sensor;
predicting a plurality of filters using a trained machine learning system, the trained machine learning system comprising a random decision forest having individual filters stored at leaf nodes of trees of the random decision forest, individual ones of the filters being associated with individual elements of the signal and conditioned on local appearances of the signal associated with the individual elements;
computing a filtered version of the input signal by applying, using the processor, the individual ones of the filters to the associated individual elements of the signal.

2. The method of claim 1 wherein the filters are kernels of numerical values and wherein computing the filtered version of the input signal comprises applying the individual filters to the individual elements of the signal.

3. The method of claim 1 wherein the input signal is a depth image and the filtered version of the input signal is a refined version of the depth image.

4. The method of claim 1 wherein the input signal is a one dimensional signal comprising measurements of state of physical apparatus and the filtered version of the input signal is a denoised version of the one dimensional signal.

5. The method of claim 1 wherein the input signal is a color image or a video and the filtered version of the input signal is a denoised version of the color image or video.

6. The method of claim 1 wherein an individual filter of a leaf node has been computed from a plurality of training signal elements reaching the leaf node during a training phase.

7. The method of claim 1 wherein a leaf node of a tree stores only one filter.

8. The method of claim 1 wherein predicting the plurality of filters comprises computing decisions at split nodes of a random decision tree, the decisions being computed using features related to a local appearance of the signal.

9. The method of claim 8 wherein the features comprise variance of magnitude of elements of the signal.

10. The method of claim 8 wherein the features are at a plurality of scales.

11. The method of claim 8 wherein the features comprise responses of split node filters applied to parts of the signal.

12. The method of claim 8 wherein the features comprise differences in responses of pairs of split node filters applied to parts of the signal.

13. The method of claim 11 wherein the split node filters are selected from components of a principal component analysis of either: training data used to train the machine learning system, or a plurality of training signal elements reaching a split node.

14. The method of claim 1 wherein the machine learning system has been trained using a training objective having a regularization term which is data dependent.

15. A computer-implemented method comprising:
receiving, at a processor, training data comprising a sensor signal and associated ground truth data;
using the training data to train a machine learning system to predict a plurality of filters, the trained machine learning system comprising a random decision forest comprising at least one filter located at least on one split or leaf node, individual ones of the filters being associated with individual elements of the signal and conditioned on local appearances of the signal associated with the individual elements.

16. The method of claim 15 wherein using the training data to train the machine learning system comprises using a training objective, the training objective having a data dependent term.

17. The method of claim 16 wherein the data dependent term is arranged to prevent overfitting of the machine learning system.

18. A signal filtering device comprising:
a processor arranged to receive an input signal from a sensor;
a signal filtering logic arranged to predict a plurality of filters, the signal filtering logic comprising a random decision forest comprising at least one filter located at least on one split or leaf node, individual ones of the filters being associated with individual elements of the signal and conditioned on local appearances of the signal associated with the individual elements;
the processor arranged to compute a filtered version of the input signal by applying the individual ones of the filters to the associated individual elements of the signal.

19. The device of claim 18 the signal filtering logic being at least partially implemented using hardware logic selected from any one or more of: a field-programmable gate array, a program-specific integrated circuit, a program-specific standard product, a system-on-a-chip, a complex programmable logic device, a graphics processing unit.

20. The device of claim 18 wherein the sensor is associated with a DC motor.

* * * * *